United States Patent
Schubert et al.

(10) Patent No.: US 7,403,848 B2
(45) Date of Patent: Jul. 22, 2008

(54) VEHICLE ROLLOVER DETECTION METHOD

(75) Inventors: Peter J. Schubert, Carmel, IN (US); Chad M. Aeschliman, Ossian, IN (US)

(73) Assignee: Delphi Technologies, Inc., Troy, MI (US)

( * ) Notice: Subject to any disclaimer, the term of this patent is extended or adjusted under 35 U.S.C. 154(b) by 758 days.

(21) Appl. No.: 10/919,162

(22) Filed: Aug. 16, 2004

(65) Prior Publication Data

US 2006/0036360 A1    Feb. 16, 2006

(51) Int. Cl.
 *G05D 1/00* (2006.01)
(52) U.S. Cl. .......................... 701/70; 340/429
(58) Field of Classification Search .............. 701/1, 701/70, 45; 340/429, 440, 689; 280/755, 280/766.1, 763.1, 735; 180/282
 See application file for complete search history.

(56) References Cited

U.S. PATENT DOCUMENTS

| | | | |
|---|---|---|---|
| 5,610,575 A | 3/1997 | Gioustos | |
| 5,825,284 A | 10/1998 | Dunwoody et al. | |
| 5,890,084 A | 3/1999 | Halasz | |
| 6,002,974 A | 12/1999 | Schiffmann | |
| 6,002,975 A | 12/1999 | Schiffmann et al. | |
| 6,332,104 B1 * | 12/2001 | Brown et al. | 701/1 |
| 6,421,592 B1 | 7/2002 | Bargman | |
| 6,542,792 B2 | 4/2003 | Schubert et al. | |
| 6,584,388 B2 | 6/2003 | Schubert et al. | |
| 6,694,225 B2 * | 2/2004 | Aga et al. | 701/1 |
| 6,714,848 B2 | 3/2004 | Schubert et al. | |
| 6,938,924 B2 * | 9/2005 | Feldman et al. | 280/755 |
| 7,058,488 B2 * | 6/2006 | Kemp et al. | 701/33 |
| 7,228,217 B2 * | 6/2007 | Iyoda et al. | 701/70 |

FOREIGN PATENT DOCUMENTS

| | | |
|---|---|---|
| DE | 102005010546 | 11/2005 |
| GB | 2314187 | 12/1997 |

OTHER PUBLICATIONS

EP Search Report dated Aug. 25, 2006.

* cited by examiner

*Primary Examiner*—Dalena Tran
(74) *Attorney, Agent, or Firm*—Jimmy L Funke

(57) ABSTRACT

Impending rollover events are detected based on vehicle roll rate, roll angle and lateral acceleration, and an assessment of the relative polarities of vehicle roll rate and lateral acceleration. When the vehicle roll rate and lateral acceleration are opposite in polarity, the roll rate vs. roll angle thresholds used to distinguish between rollover events and non-rollover events are more sensitive than for conditions for which the vehicle roll rate and lateral acceleration are of the same polarity. Additionally, the roll rate vs. roll angle thresholds are adaptively modified based on roll angle and lateral acceleration to provide increased detection sensitivity under conditions that typically precede a rollover event, and reduced detection sensitivity under conditions for which a rollover event is unlikely.

6 Claims, 4 Drawing Sheets

US 7,403,848 B2

VEHICLE ROLLOVER DETECTION METHOD

TECHNICAL FIELD

The present invention relates to rollover detection in motor vehicles, and more particularly to a detection method that provides early and reliable discrimination between rollover events and non-rollover events.

BACKGROUND OF THE INVENTION

Various rollover detection methodologies have been developed for activating electrically deployed rollover safety devices such as air bags, side curtains, seat belt pretensioners and pop-up roll bars. Additionally or alternatively, the system may activate visual, auditory or haptic warnings. A representative algorithm for detecting an impending rollover event is disclosed in the U.S. Pat. No. 6,542,792 to Schubert et al. In the disclosed algorithm, an angular rate sensor measures the vehicle attitude rate of change or angular roll rate, and an impending rollover event is detected based on a comparison of the roll rate and the corresponding roll angle. Other input signals pertaining to vehicle speed, steering wheel angle, yaw rate and side-slip angle may also be utilized. With any such algorithm, the objective is to discriminate between rollover events and non-rollover events as early as possible and as reliably as possible so that the warnings are issued and the safety devices deployed in a timely fashion, and only when actually needed.

SUMMARY OF THE INVENTION

The present invention is directed to an improved method of detecting an impending rollover event based on vehicle roll rate, roll angle and lateral acceleration, and an assessment of the relative polarities of vehicle roll rate and lateral acceleration. The method distinguishes between conditions where the vehicle roll rate and lateral acceleration are of opposite polarity and conditions where the vehicle roll rate and lateral acceleration are of the same polarity. When the vehicle roll rate and lateral acceleration are opposite in polarity, the likelihood of an impending rollover event is significantly higher, and the roll rate vs. roll angle thresholds used to distinguish between rollover events and non-rollover events are more sensitive than for conditions for which the vehicle roll rate and lateral acceleration are of the same polarity. Additionally, the roll rate vs. roll angle thresholds are adaptively modified based on roll angle, time and lateral acceleration to provide increased detection sensitivity under conditions that typically precede a rollover event, and reduced detection sensitivity under conditions for which a rollover event is unlikely.

DESCRIPTION OF THE PREFERRED EMBODIMENT

Figure 1:
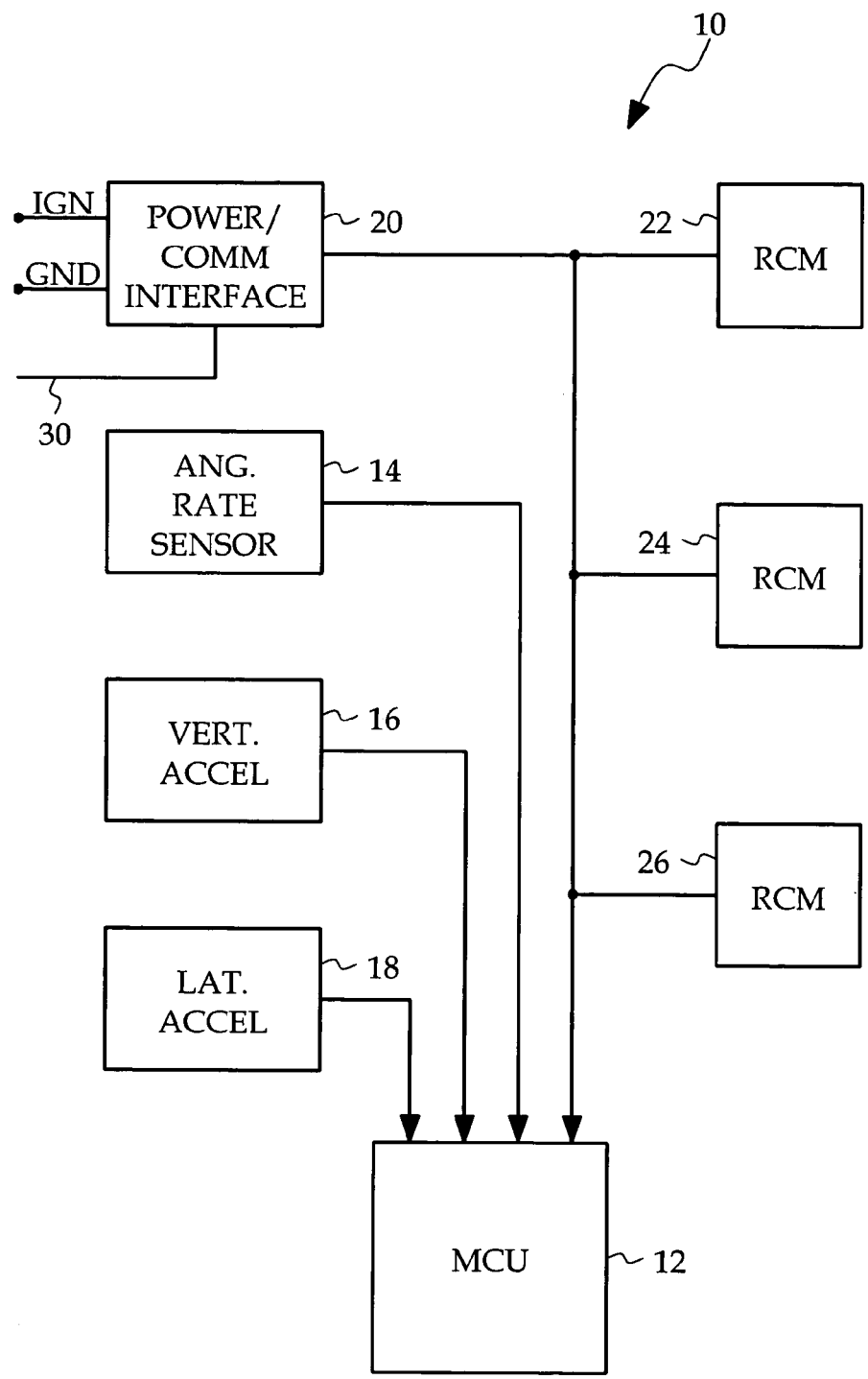
FIG. 1 is a block diagram of a rollover detection system including a microprocessor-based control unit (MCU) for carrying out the method of this invention.

Referring to FIG. 1, the method of this invention is illustrated in the context of a rollover detection system 10 including a microprocessor-based control unit (MCU) 12, an angular rate sensor 14, a vertical accelerometer 16 and a lateral accelerometer 18. The angular rate sensor 14 is responsive to the time rate of angular roll about the longitudinal axis of a vehicle in which the system 10 is installed, and it will be understood that a pitch angular rate sensor may also be included for the purpose of detecting a pitch-over condition. The MCU 12 is coupled to a power and communication interface module 20 and various restraint control modules (RCM) 22, 24, 26 by a bi-directional data communications bus 28. General vehicle sensor data available on serial data bus 30 is captured for MCU 12 by the interface module 20, and MCU 12 outputs a rollover deployment command signal on communications bus 28 when an impending rollover event is detected. The rollover deployment command signal activates the restraint control modules 22, 24, 26, which deploy various rollover restraints such as seat belt pretensioners, and side curtain airbag and a pop-up roll bar.

As described in detail in the aforementioned U.S. Pat. No. 6,542,792, incorporated herein by reference, MCU 12 integrates the roll rate measured by angular rate sensor 14 to determine the accumulated roll angle, and utilizes the combination of the measured roll rate and the determined roll angle to detect an impending rollover event. The rollover detection technique is graphically illustrated in FIG. 2, where the determined roll rate vs. roll angle operating point is compared to a grey zone 30 defined by various thresholds, including an all-deploy threshold 32, a no-deploy threshold 34, a minimum roll angle 36 and a minimum roll rate 38. In general, MCU 12 issues a rollover deployment command signal when the determined roll rate vs. roll angle operating point lies on or above the all-deploy threshold 32. When the roll rate vs. roll angle operating point lies below the all-deploy threshold 32 but within the grey zone 30, a potential rollover condition is indicated, and steps may be taken to increase the detection sensitivity if the potential rollover condition persists for at least a calibrated time interval. For example, the all-deploy threshold 32 can be temporarily adjusted downward toward the no-deploy threshold 34 as indicated by the successive threshold lines 32a, 32b, 32c, 32d, thereby increasing the likelihood of rollover safety device deployment. In the same way, the minimum roll angle threshold 36 may be temporarily increased as indicated by the threshold line 36a during events such as the return-to-ground after a near rollover to reduce the likelihood of rollover restraint deployment.

Figure 3:
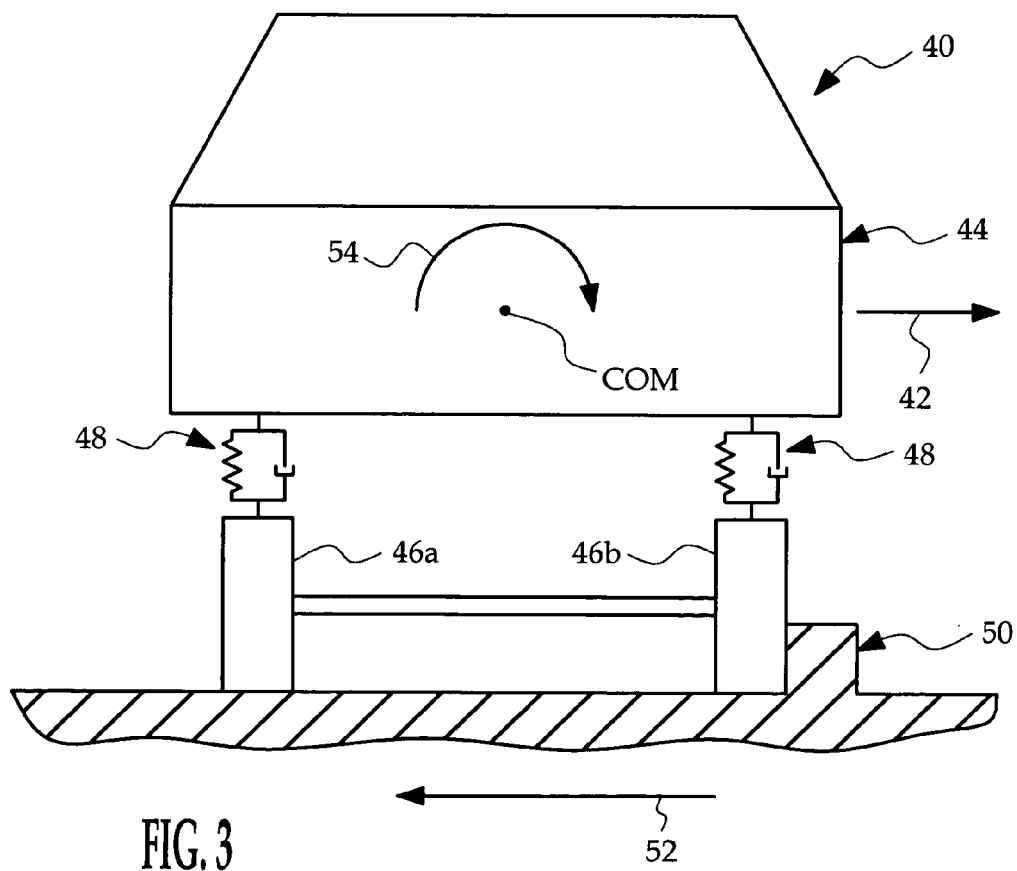
FIG. 3 is a diagram of a vehicle encountering a curb trip condition, possibly triggering a rollover event.

The present invention recognizes that most rollover events are preceded by a period during which the roll rate and the lateral acceleration of the vehicle are opposite in polarity. This principle is illustrated in FIG. 3 by the diagram of a receding vehicle 40 sliding sideways as indicated by the arrow 42. The vehicle body 44 is coupled to wheels 46a, 46b by a set of suspension members 48, and at some point, the right-hand wheels 46b contact an edge-of-roadway barrier 50 such as a curb. The impact with the barrier 50 imparts lateral acceleration to the vehicle 40 as indicated by the arrow 52. At the same time, the vehicle 40 experiences a clockwise rotational movement about the barrier 50 as indicated by the arrow 54 since the vehicle center of mass (COM) is higher than the barrier height. The lateral acceleration is considered to be negative in sign because it opposes the prevailing forces accelerating the vehicle 40 toward the barrier 50, while the clockwise rotational movement is considered to be a positive roll rate because it is consistent with the forces accelerating the vehicle 40 toward the barrier 50. Using the same polarity conventions, the roll rate and lateral acceleration are also opposite in sign when sideways sliding causes the left-hand wheels 46a to contact a barrier.

Figure 2:
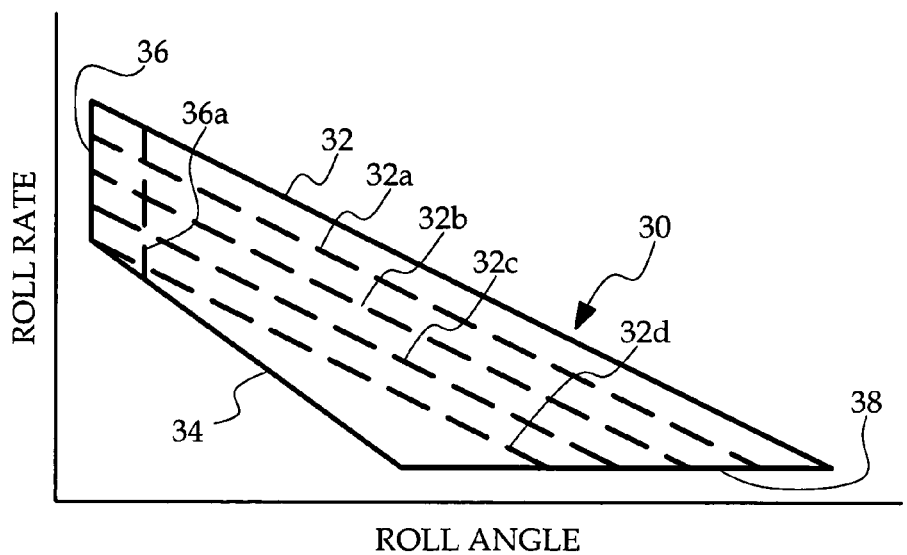
FIG. 2 graphically depicts a prior art grey zone of roll rate vs. roll angle operation for purposes of impending rollover detection.

The method of the present invention utilizes the above-described phenomenon to classify potential rollover events into one of two categories: those for which the roll rate and lateral acceleration are of opposing polarity, and those for which the roll rate and lateral acceleration are of the same polarity. The roll rate vs. roll angle thresholds of FIG. 2 are individually calibrated for each category, providing increased detection sensitivity when the propensity for rollover is highest, as indicted by opposing polarity roll rate and lateral acceleration.

Figure 4:
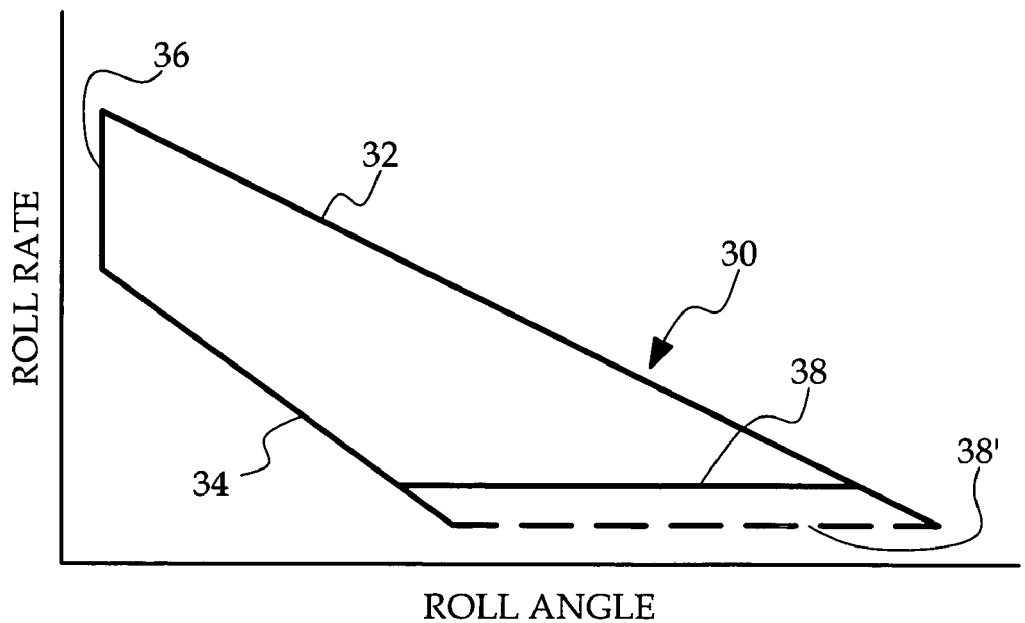
FIG. 4 graphically depicts a first adaptive threshold adjustment according to this invention.

The method of the present invention preferably also includes adaptive downward adjustment of the calibrated minimum roll rate threshold (i.e., the threshold 38 of FIG. 2) if the roll angle continuously exceeds a reference roll angle for at least a calibrated period of time. The adjustment may be a fixed, one-time adjustment, a graduated adjustment, or a staged adjustment, as desired. In any case, downward adjustment of the minimum roll rate threshold 38 increases the likelihood that the roll rate vs. roll angle operating point of the vehicle will fall within the grey zone 30, leading to earlier rollover detection in cases where the vehicle is being operated on a steep slope or where the driver makes a sudden and severe steering correction after drifting off a roadway toward a ditch or embankment. FIG. 4 graphically illustrates a one-time adaptive adjustment of the threshold 38, with the lowered threshold being designated by the reference numeral 38'.

Figure 5:
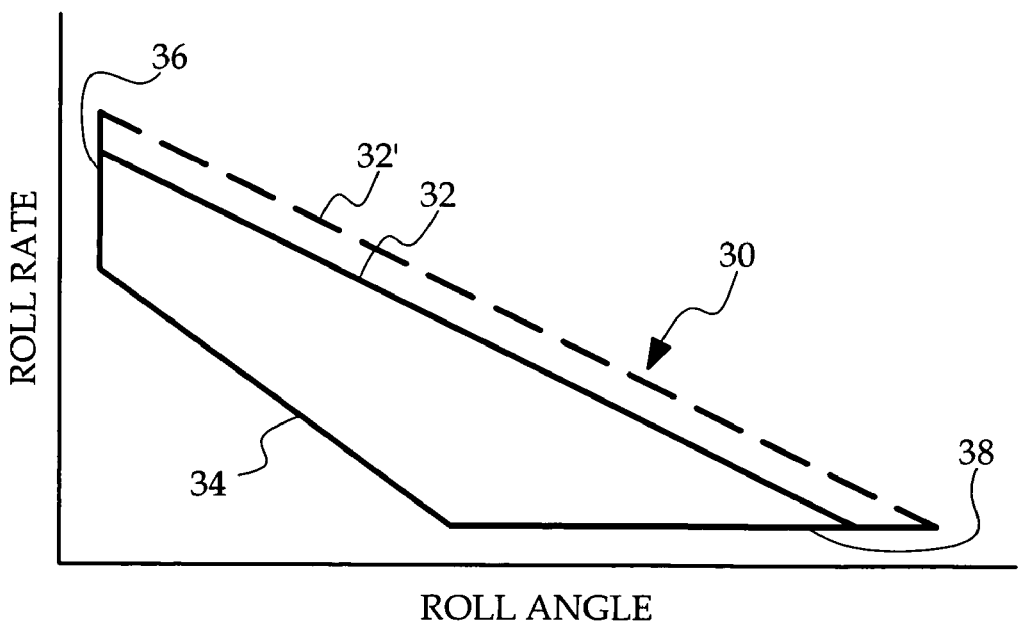
FIG. 5 graphically depicts a second adaptive threshold adjustment according to this invention.

The method of the present invention preferably also includes adaptive upward adjustment of the calibrated all-deploy threshold (i.e., the threshold 32 of FIG. 2) whenever the roll angle and roll rate exceed minimum deploy thresholds but the lateral acceleration is below a reference acceleration value. This can occur in cases which do not present a high likelihood of rollover, such as where a vehicle gradually drifts off a roadway with little or no corrective effort by the driver. FIG. 5 graphically illustrates a one-time adaptive adjustment of the all-deploy threshold 32, with the raised threshold being designated by the reference numeral 32'.

Figure 6:
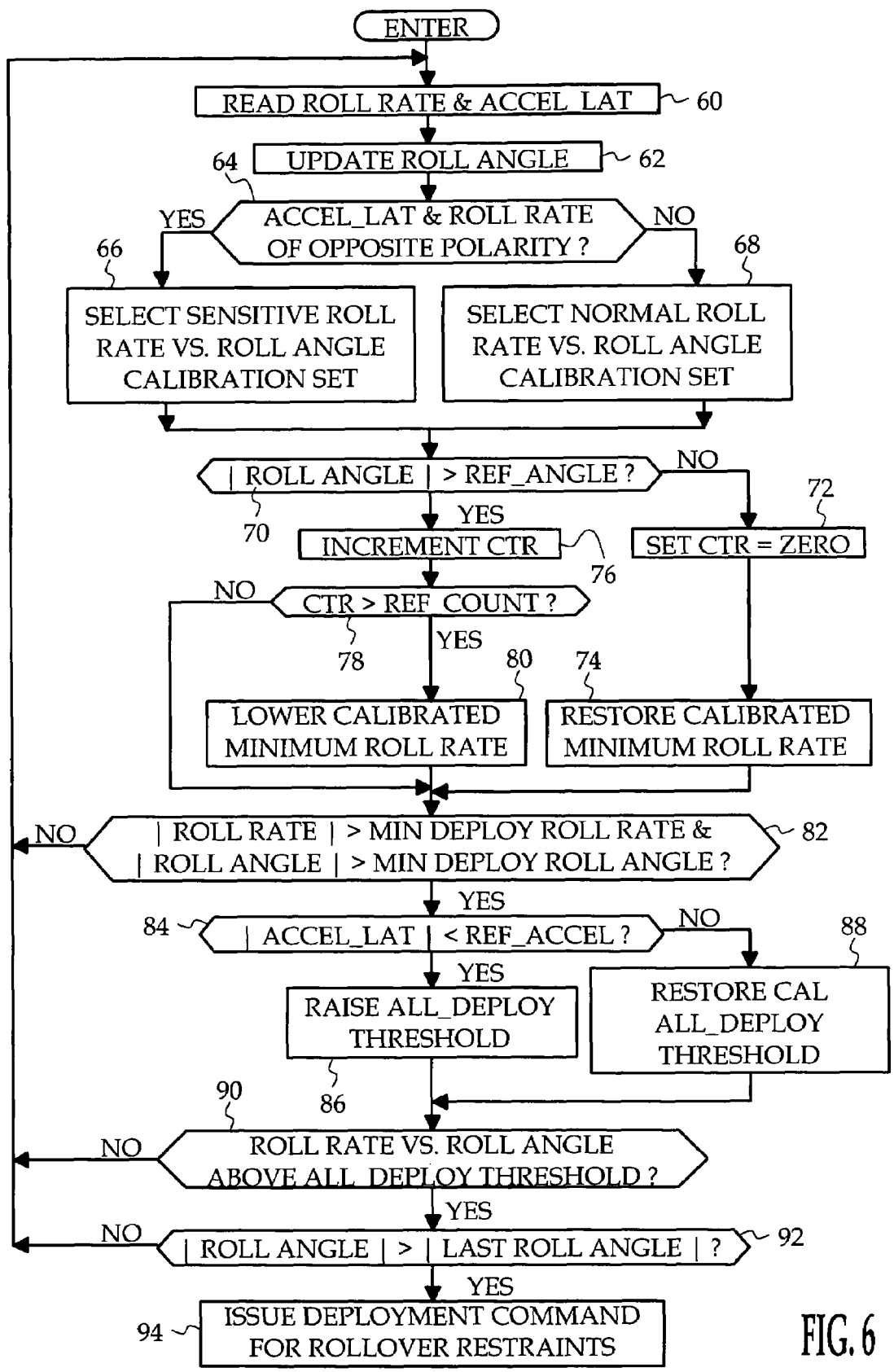
FIG. 6 is a flow diagram representative of a software routine executed by the MCU of FIG. 1 for carrying out the method of this invention.

The flow diagram of FIG. 6 represents a portion of a software routine executed by MCU 12 for carrying out the method of this invention. Initially, the block 60 is executed to read sensor information including the roll rate sensed by angular rate sensor 14 and the lateral acceleration (ACCEL_LAT) sensed by lateral accelerometer 18. The roll angle is then updated based on the current roll rate data, as indicated at block 62 and explained in the aforementioned U.S. Pat. No. 6,542,792. The block 64 then determines if ACCEL_LAT and the measured roll rate are of opposite polarity as defined above in respect to FIG. 3. If so, the block 66 selects a relatively sensitive roll rate vs. roll angle calibration set corresponding to the grey zone 30 of FIG. 2; if not, the block 68 selects a less sensitive roll rate vs. roll angle calibration set. As explained above, this enables earlier detection of an impending rollover event under conditions most conducive to rollover without sacrificing reliability.

The blocks 70-80 determine if the minimum roll rate (i.e., the threshold 38 of FIG. 2) of the selected roll rate vs. roll angle calibration set should be lowered for increased sensitivity. The block 70 determines whether the roll angle magnitude is greater than a calibrated reference angle (REF_ANGLE) such as 34-39 degrees. Ordinarily, block 70 is answered in the negative, and the blocks 72 and 74 are executed to set a counter (CTR) to zero and to retain or restore the calibrated minimum roll rate. However, whenever the roll angle magnitude exceeds REF_ANGLE, the blocks 76 and 80 are executed to increment CTR and compare its value to a calibrated reference count (REF_COLNT), corresponding to a time interval such as 600-900 msec. If the roll angle magnitude remains above REF_ANGLE for the entire time interval, the block 80 is executed to adjust the minimum roll rate downward relative to the calibrated value as described above in reference to FIG. 4. This has the effect of increasing the likelihood of rollover detection, thereby enabling earlier detection of an impending rollover event under high roll angle operating conditions without sacrificing reliability under other conditions. Lowering the minimum roll rate may directly cause the roll rate vs. roll angle operating point to exceed the all-deploy threshold 32, but may more likely cause the operating point to fall within the grey zone 30, contributing to adaptive downward adjustment of the all-deploy threshold 32 as described in the aforementioned U.S. Pat. No. 6,542,792.

The blocks 82-88 determine if the all-deploy threshold 38 of the selected roll rate vs. roll angle calibration set should be raised for reduced sensitivity. The block 82 determines whether the absolute magnitudes of the roll rate and roll angle exceed respective minimum values defined by the selected roll rate vs. roll angle calibration set, and the block 84 determines if ACCEL_LAT is below a reference acceleration (REF_ACCEL) such as 0.5-0.6 g. If blocks 82 and 84 are both answered in the affirmative, the block 86 is executed to adjust the all-deploy threshold 32 upward relative to the calibrated value as described above in reference to FIG. 5. If block 82 is answered in the negative, the routine is exited and then repeated; if block 84 is answered in the negative, the block 88 retains or restores the calibrated all-deploy threshold 32. The blocks 82-88 have the effect of reducing the likelihood of rollover detection in cases where rollover is considered to be unlikely without sacrificing rollover detection reliability under other conditions.

Finally, the block 90 compares the roll rate vs. roll angle operating point with the all-deploy threshold 32 (or 32' if adaptively adjusted). If the operating point is above the all-deploy threshold, and block 92 verifies that the magnitude of the roll angle is increasing, block 94 is executed to issue a deployment command for the rollover restraints. If the operating point is below the all-deploy threshold, or the roll angle magnitude is not increasing, the routine is exited and then repeated.

In summary, the method of the present invention provides faster and more reliable detection of an impending rollover event through selection of roll rate vs. roll angle thresholds that are tailored to specified vehicle operating conditions. In this way, rollover detection criteria may be more sensitive when operating conditions are conducive to rollover or consistent with a rollover event, and less sensitive when operating conditions are inconsistent with a rollover event. This simplifies the calibration effort while providing ample ability to tailor the deployment thresholds for optimal reliability and timing.

While the method of the present invention has been described with respect to the illustrated embodiment, it is recognized that numerous modifications and variations in addition to those mentioned herein will occur to those skilled in the art. For example, the fixed threshold adjustments of the illustrated embodiment may be replaced with variable adjustments depending on the degree to which a parameter exceeds respective reference value, and so on. Accordingly, it is intended that the invention not be limited to the disclosed embodiment, but that it have the full scope permitted by the language of the following claims.

The invention claimed is:

1. A method of detecting an impending rollover event of a vehicle, comprising the steps of:

determining a roll rate and a lateral acceleration of the vehicle;

classifying a potential rollover event based on whether the roll rate and the lateral acceleration have opposite polarities or like polarities;

selecting a first deployment threshold if the roll rate and the lateral acceleration have opposite polarities and a second deployment threshold if the roll rate and the lateral acceleration have like polarities, said first deployment threshold being more sensitive than said second deployment threshold;

determining an operating point of the vehicle; and detecting an impending rollover event of the vehicle when the determined operating point crosses the selected deployment threshold.

2. The method of claim 1, wherein said operating point is defined by said roll rate and a roll angle of the vehicle, and said first and second deployment thresholds define calibrated surfaces in roll rate vs. roll angle space.

3. The method of claim 1, including the step of:

determining a roll angle of the vehicle; and issuing a rollover restraint deployment command when the determined operating point crosses the selected deployment threshold, so long as the determined roll angle of the vehicle is increasing.

4. The method of claim 1, including the step of:

setting a minimum roll rate threshold to a calibrated value, and ruling out detection of an impending rollover event when the determined roll rate is below the minimum roll rate threshold;

determining a roll angle of the vehicle;

detecting a vehicle operating condition for which an absolute magnitude of the determined roll angle exceeds a reference roll angle for at least a reference time; and reducing said minimum roll rate threshold below said calibrated value when said vehicle operating condition is detected.

5. The method of claim 4, including the step of:

resetting said minimum roll rate threshold to said calibrated value when the absolute magnitude of the determined roll angle falls below said reference roll angle.

6. The method of claim 1, including the step of:

detecting a vehicle operating condition for which the determined lateral acceleration of the vehicle is less than a reference acceleration; and adjusting the selected deployment threshold in a direction to reduce a likelihood of impending rollover event detection so long as said vehicle operating condition is detected.

* * * * *